United States Patent
Akiyama et al.

(10) Patent No.: US 6,452,659 B1
(45) Date of Patent: Sep. 17, 2002

(54) LIQUID CRYSTAL DISPLAY DEVICE HAVING MULTIPLE INSULATING FILMS WITH DIFFERENT ETCH CHARACTERISTICS

(75) Inventors: Hisashi Akiyama; Mitsuhiro Shigeta, both of Kashiwa (JP)

(73) Assignees: Sharp Kabushiki Kaisha, Osaka (JP); The Secretary of State for in Her Brittanic Majesty's Government of the United Kingdom of Great Britain and Northern Ireland, Farnborough (GB)

( * ) Notice: Subject to any disclaimer, the term of this patent is extended or adjusted under 35 U.S.C. 154(b) by 0 days.

(21) Appl. No.: 09/062,811

(22) Filed: Apr. 20, 1998

(30) Foreign Application Priority Data

Apr. 23, 1997 (JP) ............................................. 9-106263
Mar. 24, 1998 (JP) ........................................... 10-076054

(51) Int. Cl.⁷ ..................... G02F 1/1343; G02F 1/1333; G02F 1/03
(52) U.S. Cl. ....................... 349/148; 349/138; 349/147; 430/20
(58) Field of Search ................................ 349/138, 147, 349/148; 430/20; 257/59, 72

(56) References Cited

U.S. PATENT DOCUMENTS

| | | | |
|---|---|---|---|
| 4,205,428 A | | 6/1980 | Ernstoff et al. ............ 29/592 R |
| 4,728,176 A | * | 3/1988 | Tsuboyama et al. ..... 350/350 S |
| 5,296,096 A | | 3/1994 | Enomoto et al. ............ 156/667 |
| 5,348,828 A | * | 9/1994 | Murata et al. ................. 430/20 |
| 5,358,810 A | * | 10/1994 | Yoshino ....................... 430/20 |
| 5,847,793 A | * | 12/1998 | Itoh ............................ 349/110 |
| 5,917,571 A | * | 6/1999 | Shimada ..................... 349/138 |
| 6,008,877 A | * | 12/1999 | Akiyama et al. ............ 349/147 |
| 6,097,452 A | * | 8/2000 | Shimada et al. ............... 349/38 |

FOREIGN PATENT DOCUMENTS

| | | |
|---|---|---|
| EP | 0390569 | 10/1990 |
| EP | 0468358 | 1/1992 |
| EP | 0595542 | 5/1994 |
| EP | 0788013 | 8/1997 |
| EP | 0795776 | 9/1997 |
| GB | 2110865 | 6/1983 |
| JP | 01280724 | 11/1989 |
| JP | 02063019 | 3/1990 |
| JP | 08076134 | 3/1996 |
| JP | 10012839 | 1/1998 |

OTHER PUBLICATIONS

T. Anzaki et al., Technical Report of IEICE. EID 94–144, ED 94–172, SDM 94–201 (1995–02), pp. 50–54, "Implantation of Flat Display–Use Electrodes Onto Glass Substrate Surface by Selective Deposition Method".

H. Nagayama et al., J. Electrochem. Soc.: Solid–State Science and Technology, Aug. 1998, pp. 2013–2016, A New Process for Silica Coating.

\* cited by examiner

Primary Examiner—William L. Sikes
Assistant Examiner—Tarifur R. Chowdhury
(74) Attorney, Agent, or Firm—Renner, Otto, Boisselle & Sklar

(57) ABSTRACT

A liquid crystal display device includes a transparent substrate provided with a plurality of stripe scanning electrodes, and another substrate provided with a plurality of stripe signal electrodes orthogonal to the scanning electrodes, and a liquid crystal layer enclosed between the two transparent substrates. The scanning electrodes are provided on the transparent substrate via a color filter, under overcoat film, and a hard coat film made of hard silicon resin. In the hard coat film, in order to reduce electrode resistance of the scanning electrodes, there are provided a plurality of metal electrodes which are electrically connected individually to the scanning electrodes. The metal electrodes are also connected to the signal electrodes in the same manner as the scanning electrodes.

1 Claim, 11 Drawing Sheets

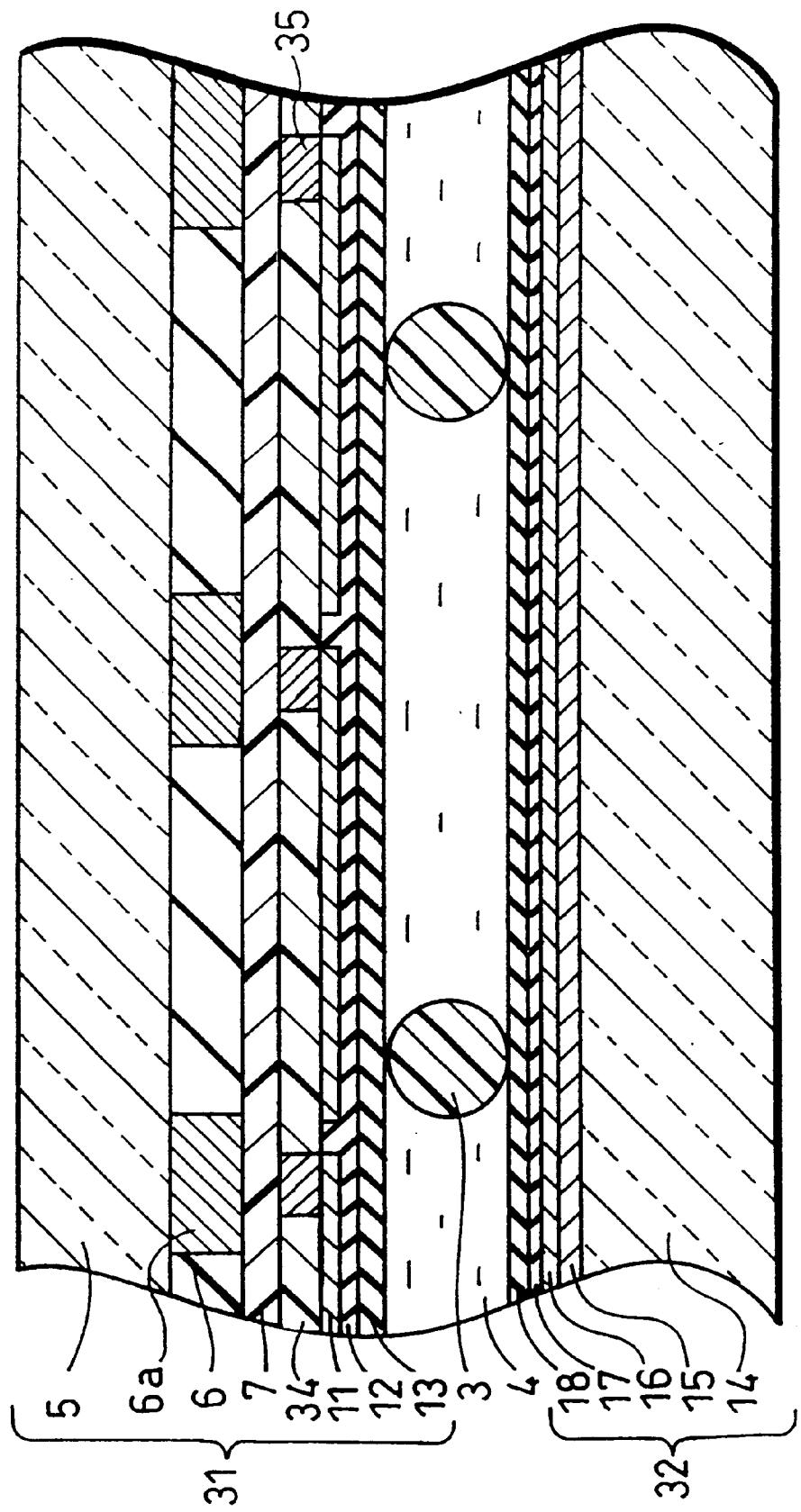

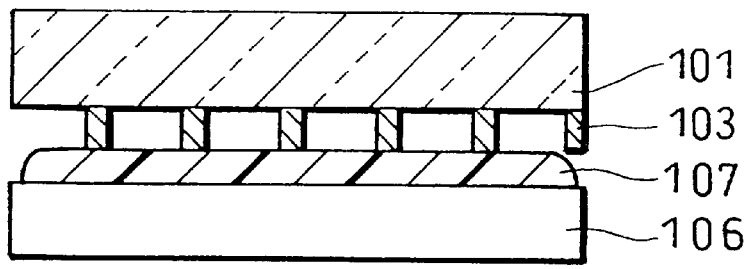
FIG.12 (a) PRIOR ART
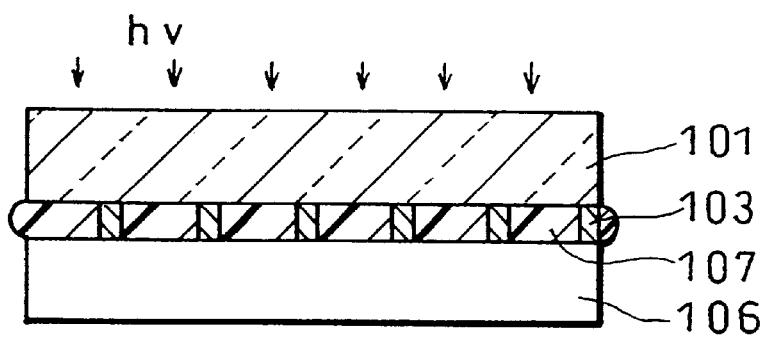
FIG.12 (b) PRIOR ART
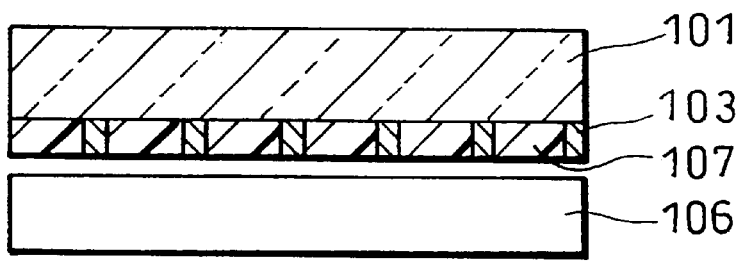
FIG.12 (c) PRIOR ART
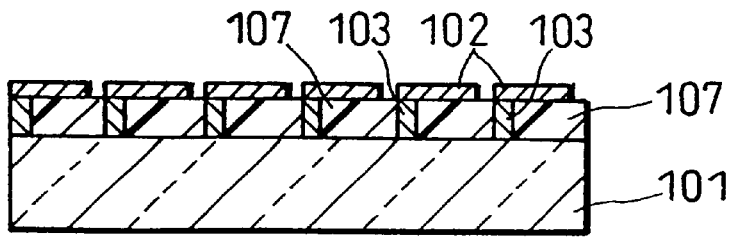
FIG.12 (d) PRIOR ART FIG.13 (a) PRIOR ART
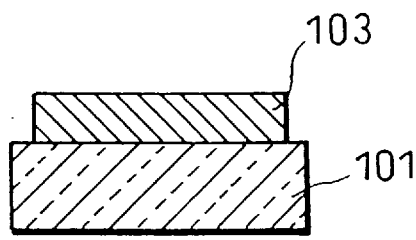
FIG.13 (b) PRIOR ART
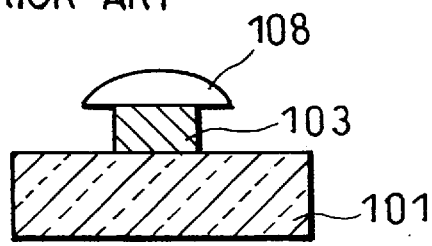
FIG.13 (c) PRIOR ART
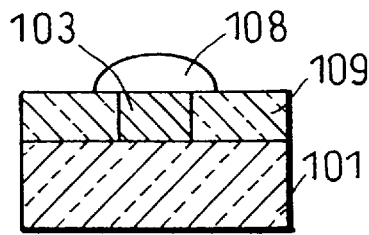
FIG.13 (d) PRIOR ART
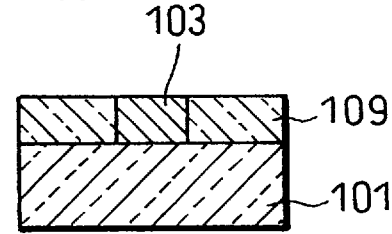

LIQUID CRYSTAL DISPLAY DEVICE HAVING MULTIPLE INSULATING FILMS WITH DIFFERENT ETCH CHARACTERISTICS

FIELD OF THE INVENTION

The present invention relates to a liquid crystal display device adopting ferroelectric liquid crystal capable of detailed displaying, particularly, in a large screen, and a manufacturing method the same.

BACKGROUND OF THE INVENTION

Conventionally, as a liquid crystal display device, a liquid crystal display device using STN (Super-Twisted Nematic) liquid crystal or TN (Twisted Nematic) liquid crystal has been known. In recent years, as a liquid crystal display device capable of highly detailed and large capacity displaying, a liquid crystal display device using ferroelectric liquid crystal has been getting an attention.

As disclosed in Appl. Phys. Lett. 36(1980) pp. 899–901 (N. A. Clark and S. T. Lagerwall), ferroelectric liquid crystal has desirable-characteristics. such as memory effect, high response, and wide viewing angle.

Further, as in the conventional liquid crystal display device of TN system. or STN system, ferroelectric liquid crystal is capable of highly detailed and large capacity displaying by the simple matrix system wherein two electrode substrates are faced each other. Note that, the electrode substrate has an arrangement wherein scanning electrodes and signal electrodes, respectively made of a transparent conducting film in stripes, are positioned in matrix. on a transparent substrate.

However, in the case of adopting the ferroelectric liquid crystal in the liquid crystal display device of simple matrix system, when a ferroelectric liquid crystal display device having a large screen with a highly detailed image is manufactured by providing the stripe electrodes which are made of only the transparent conducting film, the electrode resistance is increased as the stripe electrodes are extended in the lengthwise direction in accordance with the increased displaying area. As a result, driving problems are generated such as generation of heat, delaying of a signal, and rounding of a signal wave which is applied to the pixel region.

Note that, since the conventional liquid crystal display device of TN system or STN system adopts the multiplexing driving wherein a high contrast image is formed by scanning of a plurality of frames by application of a periodic driving voltage, a problem of lowering of displaying due to the delaying effect of the applied-voltage is not presented. However, in the ferroelectric liquid crystal display device, since it is required that a high contrast image be formed by scanning of a single frame, the delaying effect of the applied voltage becomes a problem.

For the described reason, in the case of adopting a larger screen in the ferroelectric liquid crystal display device, it has been a conventional practice to adopt a method in which the entire electrode resistance is lowered by providing metal electrodes made of a low resistant metal in the lengthwise direction of the scanning electrodes and the signal electrodes. It is required that the metal electrodes are formed along the stripe transparent electrodes (scanning electrodes or signal electrodes) in the lengthwise direction, and that the metal electrodes are electrically connected to the stripe transparent electrodes.

As a first method for forming such metal electrodes, a method for forming the stripe transparent electrodes on a transparent substrate, and then forming the metal electrodes which are electrically connected to the transparent electrodes is available. Specifically, the following methods are available. (1) As shown in FIG. 8, a method for forming metal electrodes 103 on stripe transparent electrodes 102 formed on a transparent substrate 101, along an edge 102b in the lengthwise direction on the upper surface 102a of the transparent electrodes 102, (2) as shown in FIG. 9, a method for forming the metal electrodes 103 on the stripe transparent electrodes 102 formed on the transparent substrate 101, along the edge 102b in the lengthwise direction on the upper surface 102a of the transparent electrodes 102 such that the metal electrodes 103 protrude from the edge 102b to a side surface 102c of the transparent electrodes 102 (Japanese Unexamined Patent publication No. 280724/1989 (Tokukaihei 1-280724)), and (3) as shown in FIG. 10, a method in which the stripe transparent electrodes 102 formed on the transparent substrate 101 are made contact with the metal electrodes 103 on an insulating film 104 via a through hall 105 provided on the insulating film 104 covering the transparent electrodes 102 (Japanese Unexamined Patent publication No. 280724/1989 (Tokukaihei 1-280724)).

However, in the case of adopting the first method, the metal electrodes 103 project out of the upper surface 102a of the transparent electrodes 102 or the upper surface of the insulating film 104 at least by the thickness of the transparent electrodes 102 or the insulating film 104. Here, in the case where the ferroelectric liquid crystal display device is adopted in a large screen panel, it is required that the metal electrodes 103, as a low resistant conducting film for suppressing delaying of the applied voltage, have a film thickness of not less than 0.1 $\mu$m, more preferably not less than 0.4 $\mu$m. Thus, the metal electrodes 103 project out of the upper surface of the transparent electrodes 102 or the insulating film 104 by at least 0.1 $\mu$m. Further, when adopted in a yet larger screen panel, the film thickness of the metal electrodes 103 is required to be thicker.

Also, in order to realize a surface-stabilized ferroelectric liquid crystal. display device, it is preferable that the gap between the facing electrode substrates is set in a range of substantially 1.0 $\mu$m to 3 $\mu$m. Thus, when adopted in a larger screen panel, a problem is presented that short-circuiting of the metal electrodes 103 projecting out of the upper surface of the transparent electrodes 102 or the insulating film 104 is likely to occur between the upper and lower electrode substrates facing each other.

Furthermore, since the metal electrodes 103 project out of the surface of the transparent electrodes 102 or the insulating film 104, a step-difference is created where the metal electrodes 103 are provided. This presents a problem that the alignment of the liquid crystal is changed where the step-difference is created, and as a result, uniform displaying is not realized.

In order to solve the problems of the first method, the following second through fourth methods are available.

In the second method, stripe metal electrodes are formed on a transparent substrate, and transparent electrodes are formed thereon so as to be electrically connected to the metal electrodes. As the second method, for example, the following method is available. As shown in FIG. 11, after forming the metal electrodes 103 in stripes on the transparent substrate 101, the transparent electrodes 102 are formed in stripes via the insulating film 104 so that the metal electrodes 103 and the transparent electrodes 102 are made contact with each other via the through hall 105 provided on the insulating film 104 (Japanese Unexamined Patent publication No. 63019/1990 (Tokukaihei 2-63019)). In the case of adopting the second method, compared with the case of adopting the first method, the thickness of the metal electrodes 103 can be made thicker, allowing the electrode resistance to be reduced further.

However, in the second method, it is required to provide a manufacturing step for forming the insulating film 104 between the metal electrode 103 and the transparent electrode 102, and thereafter a step for forming the through hall 105 for connecting the metal electrodes 103 and the transparent electrodes 102 to the insulating film 104. This increases the number of manufacturing steps.

Also, in the case of adopting the second method, a function of a black matrix is given to the metal electrodes 103. When the metal electrodes 103 function as a black matrix, it is required that a region A (meshed region in FIG. 11) facing a spacing between adjacent transparent electrodes 102 be covered with the metal electrodes 103. For this reason, when forming the metal electrodes 103, it is required that the metal electrodes 103 be provided in such a manner that the width of the metal electrodes 103 is wider than the width between adjacent transparent electrodes 102 so as to provide a region-where the transparent electrodes 102 and the metal electrodes 103 overlap via the insulating film 104. Thus, in the second method, although the insulating film 104 is provided between the metal electrodes 103 and the transparent electrodes 102, a problem is presented that the possibility of a leaking current flowing between the transparent electrodes 102 and the adjacent metal electrodes 103 is high.

In the third method, as disclosed in Japanese Unexamined Patent publication No. 76134/1996 (Tokukaihei 8-76134), the stripe metal electrodes are. formed on the transparent substrate, and UV (Ultra Violet light) curable resin is injected into gaps between the pattern of the metal electrodes. Namely, as shown in FIG. 12(a) through FIG. 12(d), after positioning a smooth mold 106 which has been applied with UV curable resin 107 so as to face the metal electrodes 103 with the stripe transparent substrate 101 (see FIG. 12(a)), the UV curable resin 107 is exposed by the UV light from the back surface of the transparent substrate 101 so as to form an insulating film having the same thickness as that of the metal electrodes 103 (see FIG. 12(b). Thereafter, the smooth mold 106 is removed (see FIG. 12(c)), and the transparent electrodes 102 is formed on the surface of a layer composed of the metal electrodes 103 and the UV curable resin 107 (see FIG. 12(d). In this method, since the UV light exposure is carried out after the smooth mold 106 which has been applied with the UV curable resin 107 is combined with the transparent substrate 101 provided with the metal electrodes 103, the smoothness of the insulating film made of the UV curable resin is excellent.

However, in the third method, it is required, in order to prevent bubbles from entering the UV curable resin 107, that the smooth mold 106 be combined with the transparent substrate 101 in a vacuum tank. Further, a driving system is required for combining the smooth mold 106 with the transparent substrate 101. The third method also has a problem that the manufacturing process is complicated because the smooth mold 106 is required to be cleaned every time the smooth mold 106 is used.

In the fourth method, as disclosed in J. Electrochem. Soc.; SOLID-STATE SCIENCE AND TECHNOLOGY August 1988 pp. 2013–2016, the LPD (Liquid Phase Deposition) method is adopted using $SiO_2$ amorphous film. The LPD method employs a solution of silicofluoric acid ($H_2SiF_6$: HF), and the chemical equilibrium of the solution is shifted to the side of $SiO_2$ deposition.

As shown in FIG. 13, first, the metal electrodes 103 are deposited on the transparent substrate 101 (see FIG. 13(a)), and the metal electrodes 103 are patterned, and while maintaining the photoresist 108 used in patterning (see FIG. 13(b)), a $SiO_2$ film 109 is deposited on gaps between the pattern of the metal electrodes 103 (see FIG. 13(c)). Thereafter, the photoresist 108 on the metal electrodes 103 is removed (see FIG. 13(d)). In this method, no step-difference and no grooves are created on the surfaces of the metal electrodes 103 and the $SiO_2$ film 109.

However, in the fourth method, it is required that the metal electrodes 103 be chemically resistant to hydrofluoric acid, and this sets a limit to the material of the metal electrodes 103. Further, because the deposition rate is notably slow, substantially 300 Å/hour, it takes 30 hours to deposit 1 $\mu$m. The fourth method also has a problem that the concentration of the silicofluoric acid solution is required to be carefully watched over when depositing the $SiO_2$ film 109.

SUMMARY OF THE INVENTION

It is an object of the present invention to provide a liquid crystal display device capable of uniform displaying with high contrast, which is realized by transparent electrodes having a smooth surface, and a manufacturing method of such a liquid crystal display device.

In order to achieve the above-mentioned object, a first liquid crystal display device in accordance with the present invention including a pair of electrode substrates, each having a substrate and a plurality of transparent electrodes provided in stripes on the substrate, and a liquid crystal layer enclosed in a spacing between the pair of elect-rode substrates includes an insulating film made of hard silicon resin, provided between the substrate and the plurality of transparent electrodes of at least one of the pair of electrode substrates, and a plurality of metal electrodes provided in the insulating film, electrically connected individually to the plurality of transparent electrodes.

With this arrangement, a voltage is applied between the transparent electrodes provided in stripes on each of the pair of electrodes, and the alignment state of liquid crystal molecules is switched in the intersecting regions (pixel region) of the transparent electrodes of one of the pair of electrode substrates and the transparent electrodes of the other of the pair of electrode substrates, thus displaying is carried out.

Here, since the metal electrodes are connected to transparent electrodes of at least one of the pair of electrode substrates, the electrode resistance of the transparent electrodes are greatly reduced, and it is possible to suppress rounding of the waveform of a driving voltage applied to the pixel region and temperature nonuniformity in a cell due to generated heat, thus significantly improving the displaying quality. Also, since the metal electrodes are provided between the transparent electrodes and the substrate corresponding to the transparent electrodes, even when the thickness of the metal electrodes is made thicker in order to realize a lower resistance, no short-circuiting is induced.

The hard silicon resin, due to its skeleton of the siloxane linkage (Si—O—Si), has desirable heat resistance, weather resistance, and water resistance. Also, because the hard silicon resin has a siloxane molecular arrangement of mostly three-functional units and four-functional units, which resembles the skeleton of the glass, the hard silicon resin has desirable surface hardness and abrasion resistance. Also, the silanol group produced by hydrolysis of alkoxysilane is condensed at low temperature in the presence of a catalyst so as to form a hard film, thus allowing the hard silicon resin to be deposited on the substrate with ease.

Therefore, the hard silicon resin, whose property resembles that of glass, can also be etched by hydrofluoric acid as in the glass substrate, allowing the grooves of the metal electrodes to be formed with ease. This allows the use of the manufacturing method wherein grooves are formed on the silicon resin by etching using as a mask photosensitive resin such as photoresist, and the grooves are filled with metals by vacuum deposition or spattering so as to form the metal electrodes by the lift-off method, thereby obtaining with ease a liquid crystal display device capable of uniform displaying with high contrast.

A second liquid crystal display device of the present invention including a pair of electrode substrates, each having a substrate and a plurality of transparent electrodes provided in stripes on the substrate, and a liquid crystal layer enclosed in a spacing between the pair of electrode substrates, includes a first insulating film and a second insulating film respectively provided between the substrate and the plurality of transparent electrodes of at least one of the pair of electrode substrates, the first insulating film being made of an insulating material which is not etched by dry etching using oxygen plasma or oxygen ion, the second insulating film being made of light-transmissive resin, and a plurality of metal electrodes provided in the second insulating film, electrically connected individually to the plurality of transparent electrodes.

With this arrangement, as in the first liquid crystal display device, since the metal electrodes are provided, the electrode resistance of the transparent electrodes are greatly reduced. Also, since the metal electrodes are provided between the transparent electrodes and the substrate corresponding to the transparent electrodes, even when the thickness of the metal electrodes is made thicker in order to realize a lower resistance, no short-circuiting is induced.

The light-transmissive resin can be etched with oxygen plasma or oxygen ion, and allows grooves to be formed with ease for providing the metal electrodes. This allows the use of the manufacturing method wherein grooves are formed on the light-transmissive resin by etching using photosensitive resin such as photoresist as a mask, and the grooves are filled with metals by vacuum deposition or spattering so as to form the metal electrodes by the lift-off method, thereby obtaining with ease a liquid crystal display device capable of uniform displaying with high contrast.

Further, since the first insulating film is made of an insulating material which is not etched by oxygen plasma or oxygen ion, the first insulating film acts as an etching stopper when etching is carried out, and the depth of the grooves is accurately controlled, thus allowing the surface height of the metal electrodes to be controlled.

It is preferable that the first and second liquid crystal display devices have an arrangement wherein (1) the surface height of the metal electrodes formed in the insulating film and (2) the surface height of the insulating film are equal.

It is also preferable that the first and second liquid crystal display devices have an arrangement, in order to realize detailed and large capacity displaying, wherein the liquid crystal layer includes ferroelectric liquid crystal.

In order to achieve the above-mentioned object, a method for manufacturing the liquid crystal display device of the present invention includes the steps of (a) depositing an insulating material on a substrate, (b) subjecting the insulating material to photolithography and an etching process using photosensitive resin so as to form an insulating film in stripes, while maintaining the photosensitive resin on an upper surface of the insulating material, (c) depositing a metal so as to cover the insulating film and the photosensitive resin, (d) removing an excess portion of the metal together with the photosensitive resin while maintaining the metal between stripes of the insulating film so as to form a layer composed of the insulating film and metal electrodes, (e) depositing a transparent conducting material on the layer composed of the insulating film and the metal electrodes, and (f) subjecting the transparent conducting material to photolithography and an etching process using photosensitive resin so as to form transparent electrodes in stripes electrically connected to the metal electrodes.

With this manufacturing method, the insulating film is formed in stripes, and thereafter a metal is deposited on the insulating film by vacuum deposition or spattering without removing the photosensitive resin so as to form the metal electrodes by the liftoff method. Thus, it is ensured that the metal electrodes are implanted in the insulating film without inducing pattern shifting. Further, since the metal is deposited by vacuum deposition or spattering, it is possible to control the film thickness of the metal with ease such that the surface of the metal electrodes and the surface of the insulating film coincide with a step-difference of within 30 nm. Therefore, it is possible to substantially completely eliminate the step-difference on the surface of the transparent electrodes formed on the metal electrodes and the insulating film. As a result, it is possible to manufacture a liquid crystal display device capable of realizing uniform displaying with high contrast without adversely affecting the alignment and switching characteristics of the liquid crystal.

In the above manufacturing method of the liquid crystal display device, it is preferable, in order to ensure that the metal electrodes are implanted by the lift-off method through dry etching using oxygen plasma or oxygen ion, that the insulating material deposited on the substrate is light-transmissive resin.

In the above manufacturing method of the liquid crystal display device, it is also preferable, in order to ensure that the light-transmissive resin is patterned in stripes with ease, that the etching of the insulating material is carried out by dry etching using oxygen plasma or oxygen ion.

In the above manufacturing method of the liquid crystal display device, it is also preferable, in order to ensure that the metal electrodes are implanted by the lift-off method through etching using hydrofluoric acid, that the insulating material is hard silicon resin which is prepared by curing heat curable silicon resin.

In the above manufacturing method of the liquid crystal display device, it is also preferable, in order to ensure that the silicon resin is patterned in stripes with ease, that the etching of the insulating material is carried out by wet etching using hydrofluoric acid.

For a fuller understanding of the nature and advantages of the invention, reference should be made to the ensuing detailed description taken in conjunction with the accompanying drawings.

BRIEF DESCRIPTION OF THE DRAWINGS

FIG. 5 is a cross sectional view showing a structure of a liquid crystal display device in accordance with another embodiment of the present invention.

FIG. 12(a) through FIG. 12(d) are cross sectional views showing manufacturing steps of an electrode substrate of a conventional liquid crystal display device wherein the insulating film and the metal electrodes are provided between the transparent substrate and the transparent electrodes, and the surfaces of the insulating film and the metal electrode are substantially on the same plane.

FIG. 13(a) through FIG. 13(d) are cross sectional views showing manufacturing steps of an electrode substrate of another conventional liquid crystal display device wherein the insulating film and the metal electrodes are provided between the transparent substrate and the transparent electrodes, and the surfaces of the insulating film and the metal electrode are substantially on the same plane.

DESCRIPTION OF THE EMBODIMENTS

First Embodiment

The following will describe First Embodiment of the present invention referring to FIG. 1 through FIG. 4. In the present embodiment, explanations are given based on a liquid crystal display device capable of color displaying.

Figure 1:
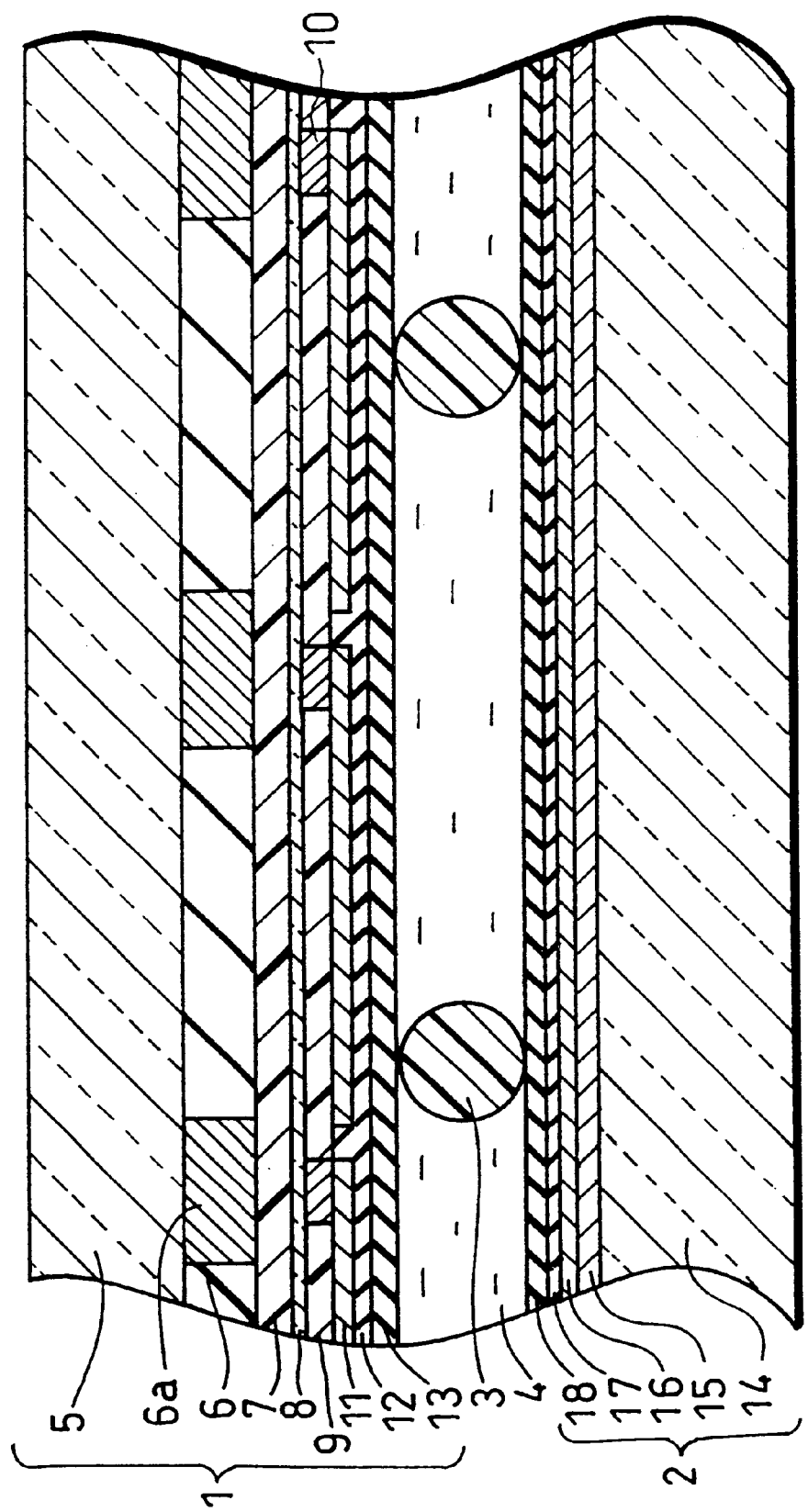
FIG. 1 is a cross sectional view showing a structure of a liquid crystal display device in accordance with one embodiment of the present invention.

As shown in FIG. 1, the present liquid crystal display device is provided with two electrode substrates 1 and 2 facing each other. A predetermined spacing is maintained between the electrode substrates 1 and 2 by spacers 3, and the electrode substrates 1 and 2 are fixed to each other by adhesion on the peripheries.

A liquid crystal material such as ferroelectric liquid crystal fills the spacing between the electrode substrates 1 and 2 so as to form a liquid crystal layer 4. Since the ferroelectric liquid crystal has such desirable characteristics as high response and memory effect, large capacity and highly detailed displaying can be realized in the liquid crystal display device.

The electrode substrate 1 has an arrangement wherein a color filter 6, an under overcoat film 7, an insulating film 8, an upper overcoat film 9 implanted with metal electrodes 10, scanning electrodes 11, an insulating film 12, and an alignment film 13 are deposited in this order on the surface of a transparent substrate (first substrate) 5 facing the electrode substrate 2.

The electrode substrate 2 has an arrangement wherein an overcoat film (not shown) implanted with metal electrodes 15, signal electrodes 16, an insulating film 17, and an alignment film 18 are deposited in this order on the surface of a transparent substrate (second substrate) 14 facing the electrode substrate 1.

The transparent substrates 5 and 14 are made of a translucent material such as glass or plastic.

The color filter 6 is composed of filters of red, green, and yellow. The arrangement of the color filter 6 is not particularly limited so that a variety of arrangements such as stripe arrangement, mosaic arrangement, and delta (triangle) arrangement are suitably adopted depending on the use. Also, as a fabricating method of the color filter 6, a variety of conventionally known methods such as pigment scattering method, dying method, electrodeposition method, and printing method are adopted.

In order to prevent light from passing through a region other than a pixel region when the pixels are in non-displaying (dark) state, and to improve the contrast, the color filter 6 is provided with a plurality of black matrices 6a made of metal or resin.

The under overcoat film 7 is provided for protection of the color filter 6, and as the material of the under overcoat film 7, polyester resin, acrylic resin, styrene resin, or other resin is adopted.

The insulating film (first insulating film) 8 is provided so that the insulating film 8 acts as a etching stopper when the metal electrodes 10 are formed in the upper overcoat film 9. As the material of the insulating film 8, a transparent insulating material, such as $SiO_2$ (silicon dioxide) or $Ta_2O_5$, (tantalum oxide), which is not etched by oxygen plasma or oxygen ion is adopted.

On the insulating film 8, the upper overcoat film (second insulating film) 9 is provided as a plurality of separate units in stripes. As the material of the upper overcoat film 9, in order to make sure that the metal electrodes 10 are implanted by the lift-off method into the grooves in the upper overcoat film 9 formed in stripes, a light-transmissive resin, such as polyester resin, acrylic resin, styrene resin, or other resin, which can be etched using a photosensitive resin such as photoresist as a mask, is adopted.

The metal electrodes 10 are provided for lowering the electrode resistance of the scanning electrodes 11. The metal electrodes 10 are implanted into the grooves in the upper overcoat film 9 formed in stripes, and form a single layer with the upper overcoat film 9. Namely, the metal electrodes 10 are positioned between adjacent edges in the upper overcoat film 9. Here, the metal electrodes 10 are placed so that the surfaces thereof are on the same level as that of the upper overcoat film 9. In short, the upper overcoat film 9 and the metal electrodes 10 are provided adjacent to each other so that the surfaces thereof are substantially on the same plane, and a single structure is formed with no step-difference between the two members.

Also, in the same manner as the metal electrodes 10 are implanted into the upper overcoat film 9, the metal electrodes 15 are implanted into the overcoat film (not shown), and are provided in stripes in a direction orthogonal to the metal electrodes 10.

Further, in order to provide a large aperture ratio which is the ratio of the pixel area to the sum of the pixel area and the non-pixel area, the metal electrodes 10 and 15 are positioned in such a manner as to overlap with the black matrices 6a.

Figure 3:
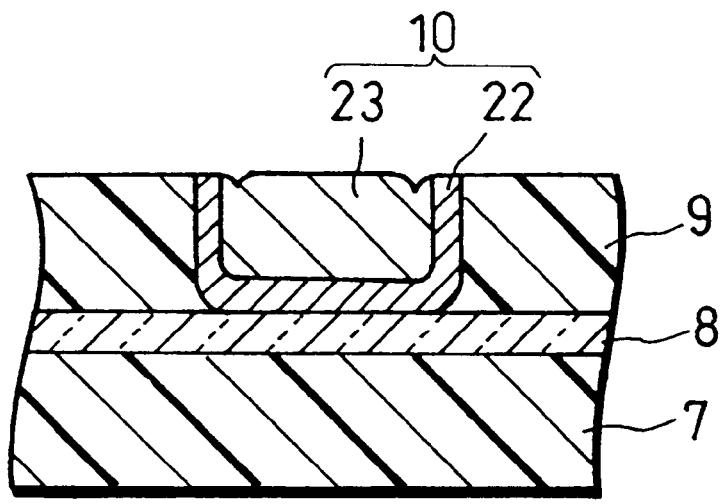
FIG. 3(a) and FIG. 3(b) are cross sectional views showing the manufacturing steps continuing from FIG. 2.
Figure 3:
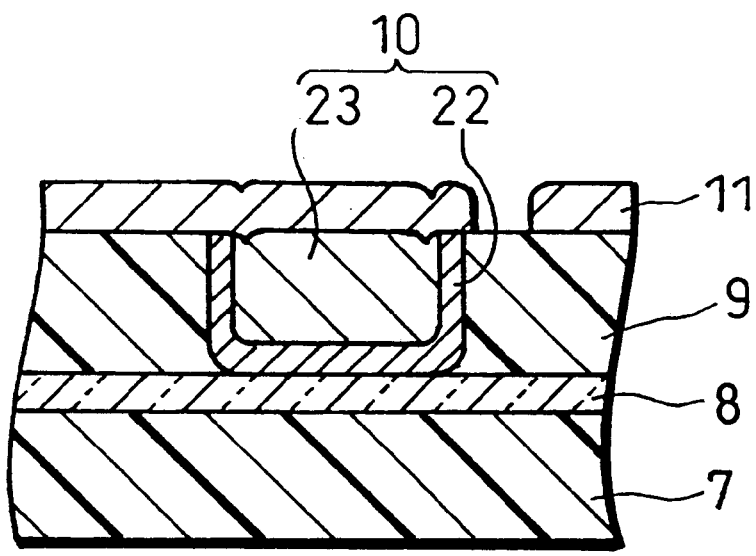

The metal electrodes 10 and 15 respectively have, as shown in FIG. 3, a double-layered structure composed of a metal film 22 and a metal film 23. The metal film 22 is provided at the interface where the metal electrodes 10 are in contact with the insulating film 8 and the upper overcoat film 9 so that the metal film 23 does not contact directly with the insulating film 8 (transparent substrate 14 in the case of metal electrodes 15) and the upper overcoat film 9 (overcoat film (not shown) in the case of metal electrodes 15).

As the material of the metal film 23, a so-called low resistant metal, such as Cu or Al, or an alloy of Cu and Al, having a lower resistance than the material of the signal electrodes 16 is adopted. As the material of the metal film 22, ITO (Indium-Tin-Oxide) or Ta (tantalum), having high adhesion not only to the low resistant metal but to glass and light-transmissive resin is adopted.

As shown in FIG. 1, the plurality of scanning electrodes (first transparent electrodes) 11 are provided in stripes, on the upper overcoat film 9 implanted with the metal electrodes 10, parallel to the lengthwise direction of the metal electrodes 10. Here, the entire surface of the metal electrodes 10, opposite to the surface contacting the insulating film 8 is connected to the surface of the scanning electrodes 11. As the material of the scanning electrodes 11, a transparent conducting material such as ITO is adopted.

The plurality of signal electrodes (second transparent electrodes) 16 are provided in stripes, on the overcoat film implanted with the metal electrodes 15, orthogonal to lengthwise direction of the scanning electrodes 11. Namely, the signal electrodes 16 are positioned in stripes in the lengthwise direction of the metal electrodes 15. Here, the entire surface of the metal electrodes 15, facing the surface contacting the transparent substrate 14 is made contact with the surface of the signal electrodes 16 so as to connect the signal electrodes 16 and the metal electrodes 15. As the material of the signal electrodes 16, a transparent conducting material such as ITO is adopted.

Here, each region made by overlapping of the scanning electrodes 11 and the signal electrodes 16 facing each other makes up a pixel region. When a voltage is applied to the scanning electrodes 11 and to the signal electrodes 16, the alignment state of ferroelectric liquid crystal molecules in the pixel region is switched. As a result, displaying in the pixel region is switched between bright and dark.

The insulating films 12 and 17 are respectively made of a transparent insulating material such as $SiO_2$ or SiN (silicon nitride).

The alignment films 13 and 18 are subjected to uniaxial alignment process such as rubbing process. As the material of the alignment films 13 and 18, a film made of an organic polymer such as polyimide, nylon, or polyvinyl alcohol, etc.; or a $SiO_2$ oblique vacuum deposition film is adopted. In the case where an organic polymer film is adopted as the alignment films 13 and 18, generally, the alignment process is carried out such that the liquid crystal molecules are aligned substantially parallel with respect to the electrode substrates.

Figure 2:
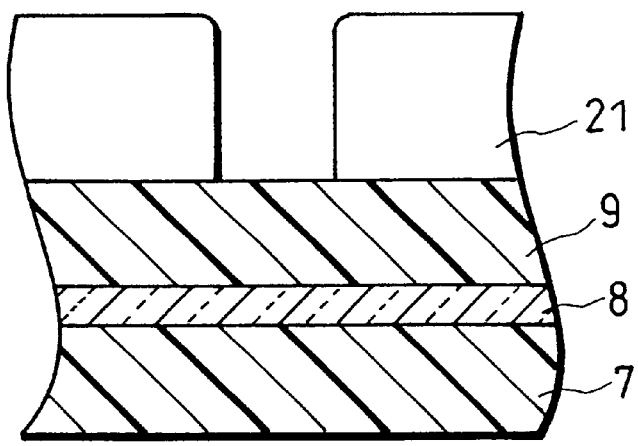
FIG. 2(a) through FIG. 2(c) are cross sectional views showing manufacturing steps of an electrode substrate of the liquid crystal display device of FIG. 1.
Figure 2:
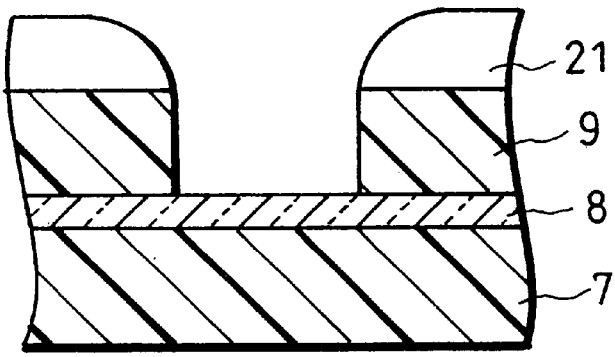
Figure 2:
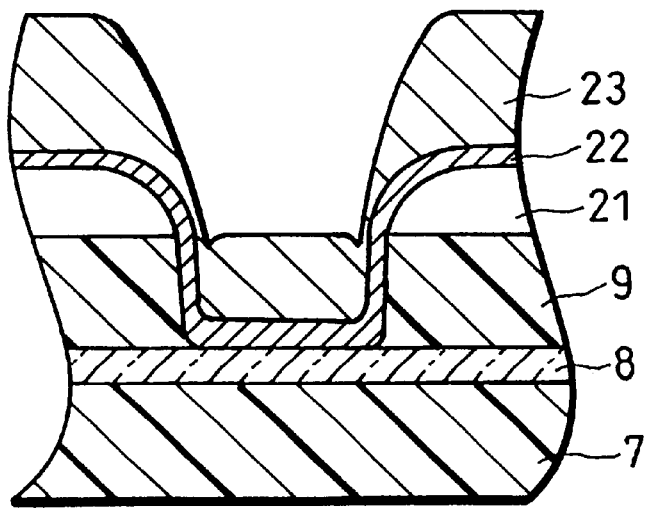

The following describes the method for manufacturing the electrode substrate 1 of the above-described liquid crystal display device referring to FIG. 2 and FIG. 3.

First, on the transparent substrate 5 provided with the color filter 6 (see FIG. 1), as shown in FIG. 2(a), the under overcoat film 7 made of translucent acrylic resin having a thickness of 2.0 μm, the insulating film 8 made of $SiO_2$ having a thickness of 300 Å, and the upper overcoat film 9 made of light-transmissive acrylic resin having a thickness of 2.0 μm are deposited in this order. Thereafter, a photoresist 21 (product name TSMR-8800 provided by Tokyo Ohka Kogyo Co., Ltd.) is spincoated, and is patterned in stripes by photolithography using a photomask for forming a metal electrode and a UV ray exposing device.

Secondly, etching is carried out onto the upper overcoat film 9 by the oxygen plasma etching with 300 Watts for 40 minutes until the insulating film 8 is exposed. The material of the upper overcoat film 9 is not limited to acrylic resin so that other resin such as polymethyl methacrylate, polystyrene, or polyimide may be adopted, provided that such resin can be etched by oxygen plasma etching. This results in, as shown in FIG. 2(b), the stripe upper overcoat film 9. Here, since the insulating film 8 acts as an etching stopper, it is possible to accurately control the depth of grooves in etching.

During deposition, it is required that the film thickness of the photoresist 21 be not less than 3.0 μm for the following reason. That is, during oxygen plasma etching, although the etching rate is lower than that of the upper overcoat film 9, the photoresist 21 is also etched. Thus, when the metal electrodes 10 are to be patterned by the lift-off method, it is required that the film thickness of the photoresist 21 after oxygen plasma etching is not less than 1.5 μm. Therefore, taking into account beforehand the thickness of the film to be etched, it is required, during deposition, that the film thickness of the photoresist 21 be not less than 3.0 μm.

Also, when the film thickness of the insulating film 8 is not less than 30 nm, the insulating film 8 acts as an etching stopper. However, considering the convenience in deposition, a film thickness of not more than 200 nm is preferable.

Thirdly, as shown in FIG. 2(c), without removing the photoresist 21, the metal film 22 is formed by spattering of ITO in a film thickness of 30 nm using a spattering device, and then the metal film 23 is formed by spattering of Cu. Here, the substrate temperature is in a range of 100° C. to 120° C., and the deposition rate is 30 nm/min to 50 nm/min. The amount of vapor deposition for the metal film 23 is controlled so as to be substantially equal to the depth (2.0 μm) of the etching groove of the upper overcoat film 9. However, the total thickness of the metal films 22 and 23 does not exceed the thickness of the upper overcoat film 9.

Fourthly, the substrate which has been provided with the metal films 22 and 23 are soaked in a solution of 3 percent by weight of sodium hydroxide, and the photoresist 21 is removed by a ultrasonic wave so as to lift off the metal films 22 and 23 respectively made of ITO and Cu on the photoresist 21. As a result, as shown in FIG. 3(a), the metal electrodes 10, made of ITO and Cu, implanted in the upper overcoat film 9 are formed.

The thickness and the width of the metal electrodes 10 are determined by a required resistance value (sheet resistance) of a combination of the metal electrodes and the transparent electrodes (scanning electrodes or signal electrodes). However, the resistance value varies in accordance with the relationship between the width of the transparent electrodes and the thickness and the width of the metal electrodes. For example, when the resistance value required is 0.1 Ω/□, and the width of the transparent electrodes is 300 μm, then the thickness and width of Cu film is set to 2 μm and 30 μm, respectively.

Figure 4:
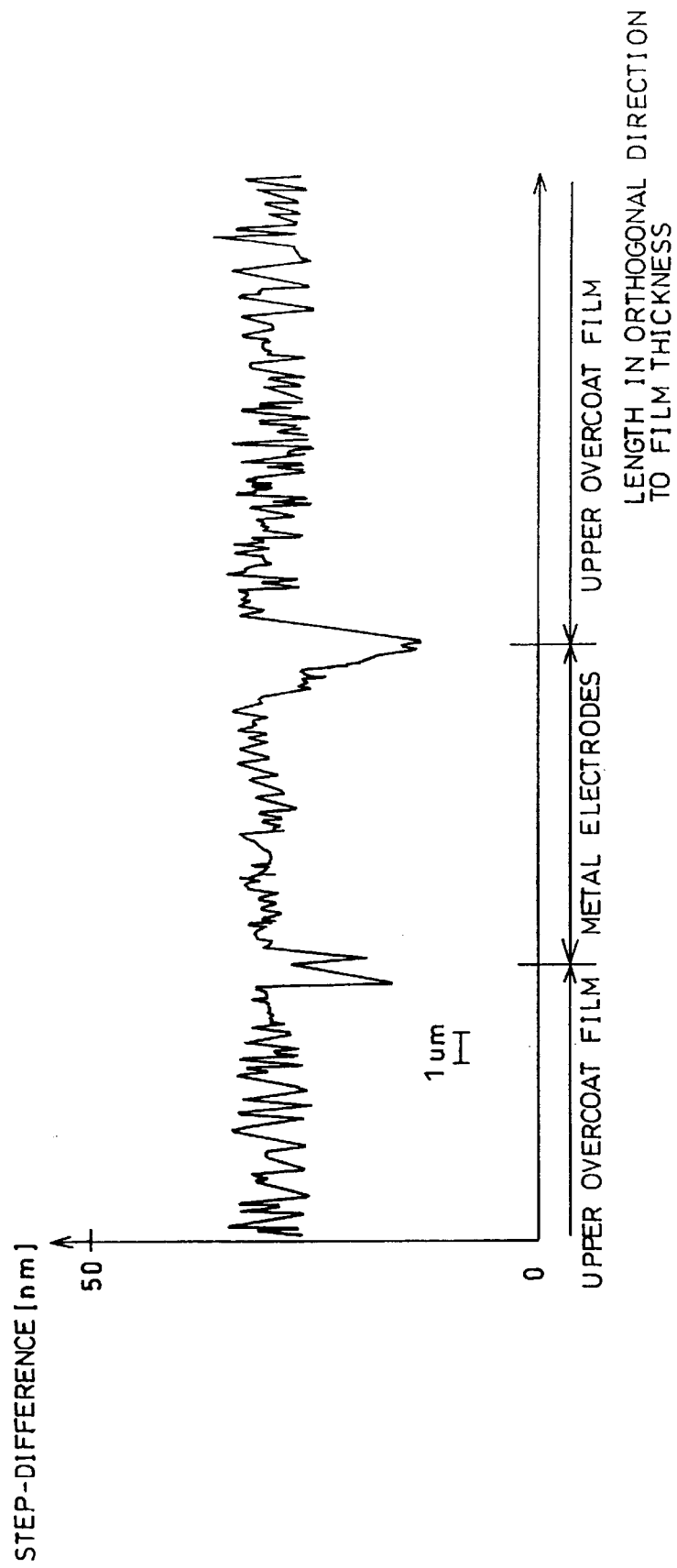
FIG. 4 is a graph showing results of a measurement in which surfaces of the metal electrode and an upper overcoat film as manufactured by the described manufacturing steps were measured by a step-difference meter.

FIG. 4 shows results of measurement of the surface shapes of the upper overcoat film 9 and the metal electrodes 10 by a step-difference meter. As it can be seen in FIG. 4, the step-difference between the surfaces of the metal electrodes 10 (mainly Cu portion) and the upper overcoat film 9 is in a range of 20 nm to 30 nm.

Here, it is ensured that the surface of the metal electrodes 10 are lower than the surface of the upper overcoat film 9, namely, it is ensured that the metal electrodes 10 do not project out of the surface of the upper overcoat film 9. This is to prevent the alignment of the ferroelectric liquid crystal in the pixel region from being disturbed by the metal electrodes 10 projecting out of the surface of the upper overcoat film 9.

Fifthly, on the substrate which has been provided with the upper overcoat film 9 and the metal electrodes 10, a transparent conducting material made of ITO is deposited, and photolithography and an etching process are carried out using photoresist. As a result, as shown in FIG. 3(b), the stripe scanning electrodes 11 electrically connected to the metal electrodes 10 are formed.

Sixth, as shown in FIG. 1, on the scanning electrodes 11, the insulating film 12 made of SiO₂ and the alignment film 13 made of polyimide are formed in this order, and the alignment film 13 is subjected to the uniaxial alignment process by rubbing.

Finally, the electrode substrate 1 thus prepared is faced with the electrode substrate 2 which has been prepared in the same manner, and the ferroelectric liquid crystal is injected therebetween, thus obtaining the liquid crystal display device. Note that, in manufacturing of the electrode substrate 2, processes for forming the color filter 6 on the electrode substrate 1, the under overcoat film 7, and the insulating film 8 are omitted. Also, in the manufacturing process of the electrode substrate 2, the transparent substrate 14 acts as the etching stopper.

In the liquid crystal display device as manufactured in the described method, when a signal is applied to the scanning electrodes 11 and the signal electrodes 16, no short-circuiting was induced, and no rounding of waveform was observed in the applied signal to the pixel region. Further, since the metal electrodes 10 and 15 are provided in an overlapping manner with the black matrices 6a, the metal electrode portions as non-pixel portions are shielded by the black matrices 6a, thus realizing uniform displaying with high contrast.

As described, the liquid crystal display device in accordance with the present embodiment includes the transparent substrate 5 provided with a plurality of scanning electrodes 11 formed in stripes, the transparent substrate 14 provided with a plurality of signal electrodes 16 formed in stripes orthogonal to the scanning electrodes 11, and the liquid crystal layer 4 enclosed between the transparent substrates 5 and 14.

The scanning electrodes 11 are positioned on the transparent substrate 5 via the insulating film 8 made of an insulating material which is not etched by oxygen plasma and oxygen ion, and via the upper overcoat film 9 made of light-transmissive resin, and in the upper overcoat film 9 is formed a plurality of metal electrodes 10 which are electrically connected individually to the scanning electrodes 11 provided in stripes.

With this arrangement, a voltage is applied between the scanning electrodes 11 and the signal electrodes 16, and as a result, the alignment state of the liquid crystal molecules in the intersecting regions (pixel region) is switched, thus carrying out displaying.

Here, since the metal electrodes 10 are connected to the scanning electrodes 11, the electrode resistance of the scanning electrodes 11 are greatly reduced, and it is possible to suppress the rounding of the waveform of a driving voltage applied to the pixel region and temperature nonuniformity in a cell due to generated heat, thus significantly improving the displaying quality. Also, since the metal electrodes 10 are provided between the scanning electrodes 11 and the transparent substrate 5, even when the thickness of the metal electrodes 10 is made thicker in order to realize a lower resistance, no short-circuiting is induced.

The light-transmissive resin can be etched with oxygen plasma or oxygen ion, and allows grooves to be formed with ease for providing the metal electrodes 10. This allows the use of the manufacturing method wherein grooves are formed on the light-transmissive resin by etching using photosensitive resin such as photoresist as a mask, and the grooves are filled with metals by vacuum deposition or spattering so as to form the metal electrodes 10 by the lift-off method, thereby obtaining with ease a liquid crystal display device capable of uniform displaying with high contrast.

Further, since the insulating film 8 is made of an insulating material which is not etched by oxygen plasma or oxygen ion, the insulating film 8 acts as an etching stopper when etching is carried out, and the depth of the grooves is accurately controlled, thus allowing the surface height of the metal electrodes 10 to be controlled.

Also, the metal electrodes 10 formed in the upper overcoat film 9 have such an arrangement that the surface of the metal electrodes 10 is on the same level as the surface of the upper overcoat film 9.

With this arrangement, since the surface of the metal electrodes 10 is on the same level as the surface of the upper overcoat film 9, the scanning electrodes 11 are formed on a flat surface. As a result, it is possible to substantially completely eliminate the step-difference on the surface of the scanning electrodes 11, which causes an adverse effect on the image quality of the liquid crystal display device. Therefore, it is possible to prevent disturbance in the alignment of the liquid crystal layer 4 caused by the step-difference, thus further improving the image quality of the liquid crystal display device.

Further, since the liquid crystal layer 4 is made of the ferroelectric liquid crystal, it is possible to provide a liquid crystal display device having desirable characteristics such as memory effect, high response, and wide viewing angle, capable of highly detailed and large capacity displaying.

The manufacturing method of the liquid crystal display device in accordance with the present embodiment includes the steps of (1) depositing an insulating material on the transparent substrate 5, (2) forming the upper overcoat film 9 in stripes by subjecting the insulating material to photolithography and an etching process using the photoresist 21, (3) depositing metals on the upper overcoat film 9 while maintaining the photoresist 21, (4) forming the metal electrodes 10 in the upper overcoat film 9 by removing the metals deposited on the upper overcoat film 9 simultaneously with the photoresist 21, (5) depositing a transparent conducting material on a layer composed of the upper overcoat film 9 and the metal electrodes 10, and (6) forming the scanning electrodes 11 in stripes by subjecting the transparent conducting material to photolithography and an etching process using photoresist.

With this manufacturing method, the upper overcoat film 9 is formed in stripes, and thereafter metals are deposited on the upper overcoat film 9 by vacuum deposition or spattering without removing the photoresist 21 so as to form the metal electrodes 10 by the lift-off method. Thus, it is ensured that the metal electrodes 10 are implanted in the upper overcoat film 9 without inducing pattern shifting. Further, since the metals are deposited by vacuum deposition or spattering, it is possible to control the film thickness of the metals with ease such that the surface of the metal electrodes 10 and the surface of the upper overcoat film 9 coincide with a step-difference of within 30 nm. Therefore, it is possible to substantially completely eliminate the step-difference on the surface of the scanning electrodes 11 formed on the metal electrodes 10 and the upper overcoat film 9. As a result, it is possible to manufacture a liquid crystal display device capable of realizing uniform displaying with high contrast without adversely affecting the alignment and switching characteristics of the liquid crystal.

Also, the insulating material deposited on the transparent substrate 5 is made of light-transmissive resin. In order to implant the metal electrodes 10 into the grooves of the upper overcoat film 9, it is required that the upper overcoat film 9 be made of a material which can be etched using photosensitive resin such as photoresist as a mask. The light-transmissive resin can be etched by oxygen plasma or oxygen ion, and therefore allows the metal electrodes 10 to be implanted by the lift-off method. Note that, in the case of adopting photosensitive resin as an insulating material, although patterns can be formed with ease, the lift-off method cannot be adopted. However, in the case where photosensitivity of such material is not used, it is possible to adopt the lift-off method as in the manufacturing process of the present embodiment.

Further, the upper overcoat film 9 is etched by dry etching using oxygen plasma or oxygen ion. Thus, since the light-transmissive resin can be etched by oxygen plasma or oxygen ion, by carrying out photolithography and a dry etching process using oxygen plasma or oxygen ion, the light-transmissive resin can be patterned in stripes with ease.

Note that, the described effects can also be obtained in the metal electrodes 15 connected to the signal electrodes 16 since the same arrangement and the manufacturing method are adopted.

Second Embodiment

Figure 6A:
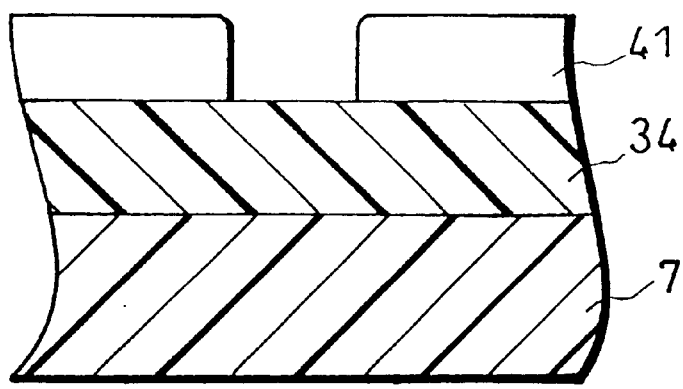
FIG. 6(a) through FIG. 6(c) are cross sectional views showing manufacturing steps of an electrode substrate of the liquid crystal display device of FIG. 5.
Figure 6B:
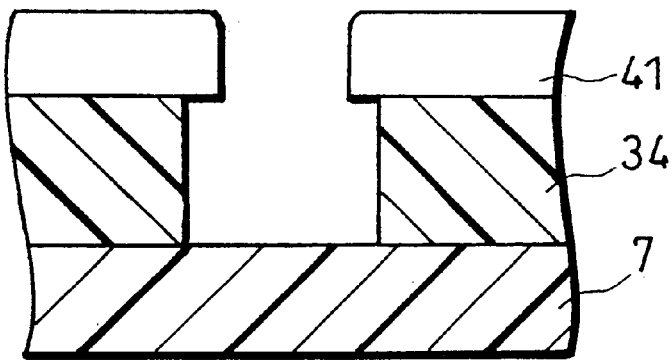
Figure 6C:
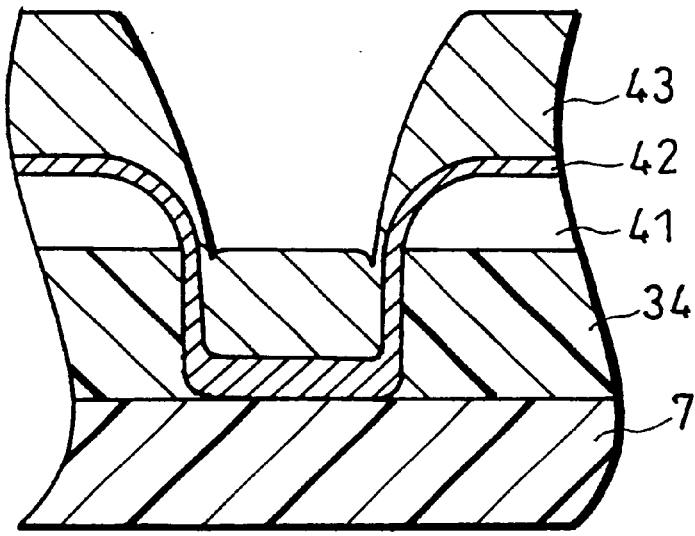
Figure 7A:
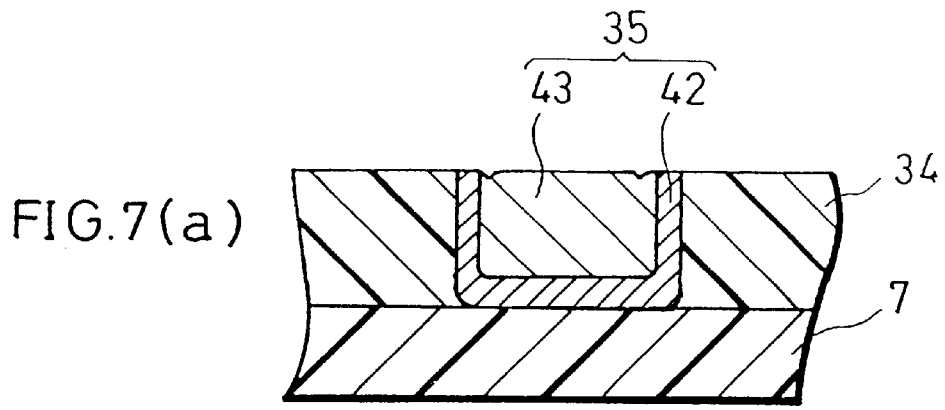
FIG. 7(a) and FIG. 7(b) are cross sectional views showing the manufacturing steps continuing from FIG. 6.
Figure 7B:
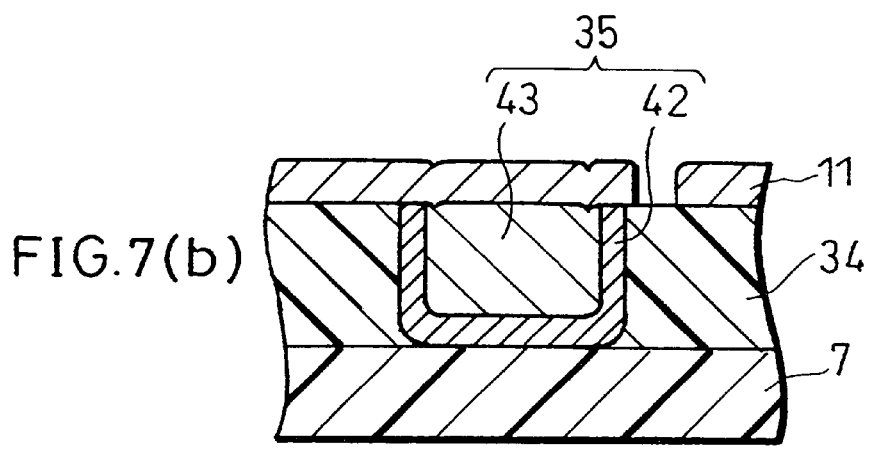
Figure 8:
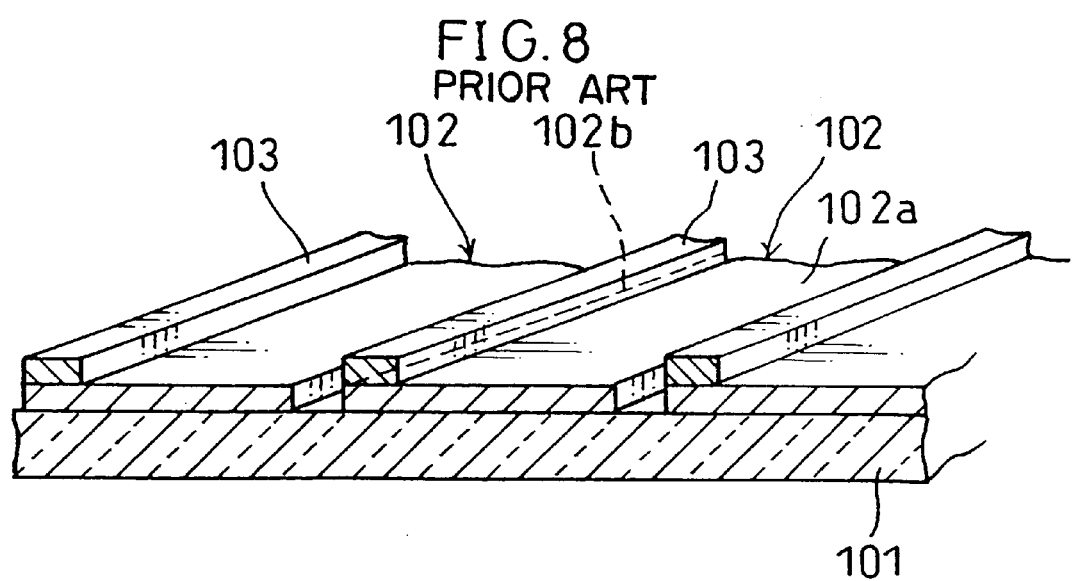
FIG. 8 is a perspective view showing a structure of an electrode substrate of a conventional liquid crystal display device wherein metal electrodes are provided on transparent electrodes.
Figure 9:
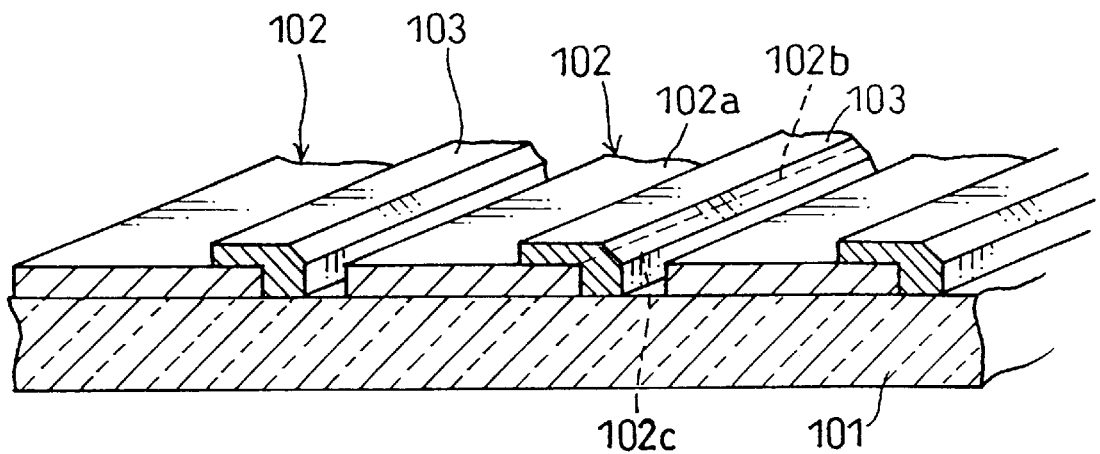
FIG. 9 is a perspective view showing a structure of an electrode substrate of another conventional liquid crystal display device wherein metal electrodes are provided on transparent electrodes.
Figure 10:
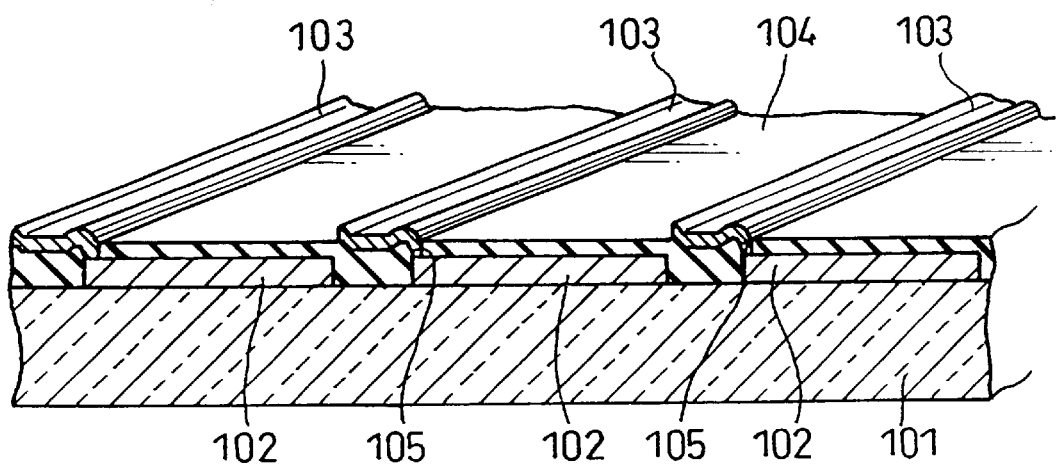
FIG. 10 is a perspective view showing a structure of an electrode substrate of still another conventional liquid crystal display device wherein metal electrodes are provided on transparent electrodes.
Figure 11:
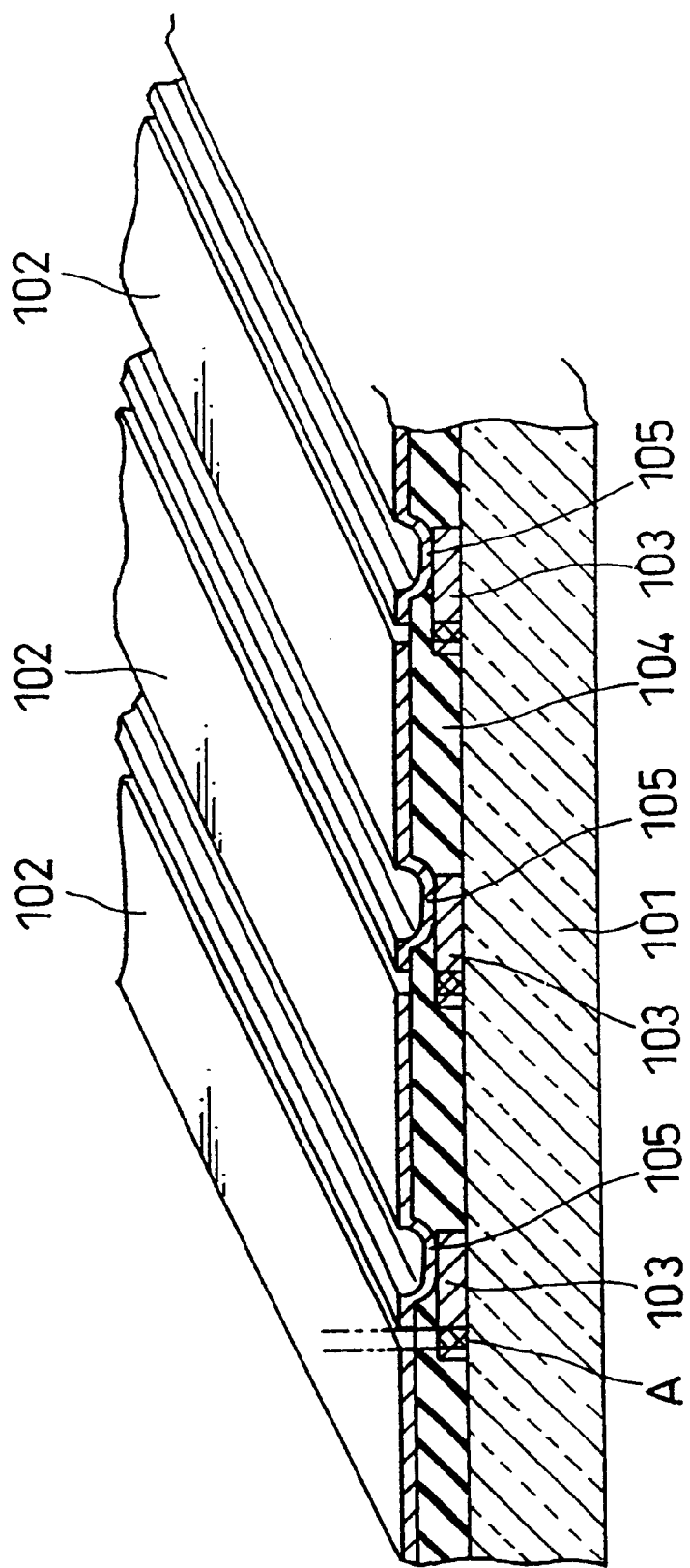
FIG. 11 is a perspective view showing a structure of an electrode substrate of a conventional liquid crystal display device wherein an insulating film and metal electrodes are provided between the transparent substrate and the transparent electrodes.

The following will describe Second Embodiment of the present invention referring to FIG. 5 through FIG. 7. Note that, for convenience, members having the same functions as the members indicated in the previous embodiment are given the same reference numerals, and the explanations thereof are omitted.

As shown in FIG. 5, the liquid crystal display device in accordance with the present embodiment has the same arrangement as that of First Embodiment except that electrode substrates 31 and 32 are provided instead of the electrode substrates 1 and 2.

The electrode substrate 31 has an arrangement wherein a color filter 6 having black matrices 6a, an under overcoat film 7, a hard coat film 34 implanted with metal electrodes 35, a scanning electrodes 11, an insulating film 12, and an alignment film 13 are deposited in this order on the surface of a transparent substrate 5 facing the electrode substrate 32.

The arrangement of the electrode substrate 32 is the same as that of the electrode substrate 2. Namely, on the surface of a transparent substrate 14 facing the electrode substrate 31, an overcoat film (not shown) implanted with metal electrodes 15, signal electrodes 16, an insulating film 17, and an alignment film 18 are deposited in this order.

On the under overcoat film 7, the hard coat film (insulating film) 34 is provided as a plurality of separate units in stripes. As the material of the hard coat film 34, in order to make sure that the metal electrodes 35 are implanted by the lift-off method into the grooves in the hard coat film 34 formed in stripes, hard silicon resin, which can be etched using photosensitive resin such as photoresist as a mask, is adopted. Hard silicon resin can be wet-etched using hydrofluoric acid.

The metal electrodes 35 are provided for lowering the electrode resistance of the scanning electrodes 11. The metal electrodes 35 are implanted into the grooves in the hard coat film 34 formed in stripes, and form a single layer with the hard coat film 34. Namely, the metal electrodes 35 are positioned between adjacent edges of the hard coat film 34. Here, the metal electrodes 34 are placed so that the upper surface thereof is on the same level as that of the hard coat film 34. In short, the hard coat film 34 and the metal electrodes 35 are provided adjacent to each other so that the surfaces thereof are substantially on the same plane, and a single structure is formed with no step-difference between the two members.

Also, as in the metal electrodes 10, in order to provide a large aperture ratio which is the ratio of the pixel area to the sum of the pixel area and the non-pixel area, the metal electrodes 35 are positioned so as to overlap with the black matrices 6a.

The material and the structure of the metal electrodes 35 are the same as that of the metal electrodes 10 of First Embodiment.

The following will describe the manufacturing method of the electrode substrate 31 of the above-described liquid crystal display device referring to FIG. 6 and FIG. 7.

First, on the transparent substrate 5 provided with the color filter 6 (see FIG. 5), as shown in FIG. 6(a), the under overcoat film 7 made of acrylic resin having a thickness of 3.5 $\mu$m is deposited. Thereafter, a heat-curable silicon hard coat agent (product name KP-8530 provided by Shin-Etsu Chemical Co., Ltd.) is deposited by a spin coater in a film thickness of 2.0 $\mu$m. After maintaining at room temperature for 10 minutes, the substrate complex thus prepared is heated at 120° C. for 1 hour so as to promote reaction in the hard coat film 34. Then, a photoresist 41 (product name TSMR-8800 provided by Tokyo Ohka Kogyo Co., Ltd.) is spincoated, and is patterned in stripes by photolithography using a photomask for forming the metal electrodes and a UV ray exposing device.

Then, the hard coat film 34 is etched by buffered hydrofluoric acid (mixed solution of HF (hydrogen fluoride) and NH$_4$F (ammonium fluoride) in a ratio of 1 to 6). It takes 40 minutes to etch the hard coat film 34 having a thickness of 2.0 $\mu$m. However, since the under overcoat film 7 made of acrylic resin acts as an etching stopper, the depth of the etching groove is equal to the thickness of the hard coat film 34, in this case, 2.0 $\mu$m. This results in, as shown in FIG. 6(b), the hard coat film 34 formed in stripes.

The following steps are the same as in First Embodiment.

Namely, as shown in FIG. 6(c), without removing the photoresist 41, the metal film 42 is formed by spattering of ITO with a film thickness of 30 nm using a spattering device, and then the metal film 43 is formed by spattering of Cu. Here, the substrate temperature is in a range of 100° C. to 120° C., and the deposition rate is 30 nm/min to 50 nm/min. The amount of vapor deposition for the metal film 43 is controlled so as to be substantially equal to the depth (2.0 μm) of the etching groove of the hard coat film 34. However, the total thickness of the metal films 42 and 43 is controlled so as not to exceed the thickness of the hard coat film 34.

Note that, because the wet etching by buffered hydrofluoric acid is isotropic, as shown in FIG. 6(*b*), the photoresist 41 is overhung after etching of the hard coat film 34, and when spattering of metals such as ITO and Cu is carried out under this condition, a spacing is created between the metals and the hard coat film 34. For this reason, the photoresist 41 is heated by irradiation of UV light so as to remove the overhang, thus preventing the spacing after lift-off.

Then, the substrate which has been provided with the metal films 42 and 43 are soaked in a solution of 3 percent by weight of sodium hydroxide, and the photoresist 41 is removed by a ultrasonic wave so as to lift off the metal films 42 and 43 respectively made of ITO and Cu on the photoresist 41. As a result, as shown in FIG. 7(*a*), the metal electrodes 35, made of ITO and Cu, implanted in the hard coat film 34 are formed.

Then, on the substrate which has been provided with the hard coat film 34 and the metal electrodes 35, a transparent conducting material made of ITO is deposited, and photolithography and an etching process are carried out using photoresist. As a result, as shown in FIG. 7(*b*), the stripe scanning electrodes 11 electrically connected to the metal electrodes 35 are formed.

Then, as shown in FIG. 5, on the scanning electrodes 11, the insulating film 12 made of $SiO_2$ and the alignment film 13 made of polyimide are formed in this order, and the alignment film 13 is subjected to the uniaxial alignment process by rubbing.

Finally, the electrode substrate 31 thus prepared is faced with the electrode substrate 32 which has been prepared in the same manner as the electrode substrate 2 of First Embodiment, and the ferroelectric liquid crystal is injected therebetween, thus obtaining the liquid crystal display device.

In the liquid crystal display device as manufactured in the described method, as in First Embodiment, when a signal is applied to the scanning electrodes 11 and the signal electrodes 16, no short-circuiting was induced, and no rounding of waveform was observed in the applied signal to the pixel region. Further, since the metal electrodes 35 and 15 are provided in an overlapping manner with the black matrices 6*a*, the metal electrode portions are shielded by the black matrices 6*a*, thus realizing uniform displaying with high contrast.

As described, the liquid crystal display device in accordance with the present embodiment includes the transparent substrate 5 provided with a plurality of scanning electrodes 11 formed in stripes, the transparent substrate 14 provided with a plurality of signal electrodes 16 formed in stripes orthogonal to the scanning electrodes 11, and the liquid crystal layer 4 enclosed between the transparent substrates 5 and 14.

The scanning electrodes 11 are positioned on the transparent substrate 5 via the hard coat film 34 made of a hard silicon resin, and in the hard coat film 34 is formed a plurality of metal electrodes 35 which are electrically connected individually to the scanning electrodes 11 provided in stripes.

With this arrangement, as in First Embodiment, since the metal electrodes 35 are connected to the scanning electrodes 11, the electrode resistance of the scanning electrodes 11 are greatly reduced, and it is possible to suppress the rounding of the waveform of a driving voltage applied to the pixel region and temperature nonuniformity in a cell due to generated heat, thus significantly improving the displaying quality. Also, since the metal electrodes 35 are provided between the scanning electrodes 11 and the transparent substrate 5, even when the thickness of the metal electrodes 35 is made thicker in order to realize a lower resistance, no short-circuiting is induced.

The hard silicon resin, due to its skeleton of the siloxane linkage (Si—O—Si), has desirable heat resistance, weather resistance, and water resistance. Also, because the hard silicon resin has a siloxane molecular arrangement of mostly three-functional units and four-functional units, which resembles the skeleton of the glass, the hard silicon resin has desirable surface hardness and abrasion resistance.

The hard silicon resin is made from a colloidal metal oxide or four, three, and two if required, functional alkoxysilane, and the silanol group produced by hydrolysis of alkoxysilane is condensed at low temperature in the presence of a catalyst so as to form a hard film, thus allowing the hard silicon resin to be deposited on the substrate with ease. Note that, the film hardness is achieved by four-functional units such as a colloidal metal oxide.

Therefore, the hard silicon resin, whose property resembles that of glass, can also be etched by hydrofluoric acid as the glass substrate, allowing the grooves of the metal electrodes 3S to be formed with ease. This allows the use of the manufacturing method wherein grooves are formed on the silicon resin by etching using photosensitive resin such as photoresist as a mask, and the grooves are filled with metals by vacuum deposition or spattering so as to form the metal electrodes 35 by the lift-off method, thereby obtaining with ease a liquid crystal display device capable of uniform displaying with high contrast.

Also, the metal electrodes 35 formed in the hard coat film 34 have such an arrangement that the surface of the metal electrodes 35 are on the same level as the surface of the hard coat film 34.

With this arrangement, since the surface of the metal electrodes 35 are on the same level as the surface of the hard coat film 34, the scanning electrodes 11 are formed on a flat surface. As a result, it is possible to substantially completely eliminate the step-difference on the surface of the scanning electrodes 11, which cause an adverse effect on the image quality of the liquid crystal display device, and therefore it is possible to prevent disturbance in the alignment of the liquid crystal layer 4 caused by the step-difference, thereby further improving the image quality of the liquid crystal display device.

Further, since the liquid crystal layer 4 is made of the ferroelectric liquid crystal, it is possible to provide a liquid crystal display device having desirable characteristics such as memory effect, high response, and wide viewing angle, capable of highly detailed and large capacity displaying.

Also, the manufacturing method of the liquid crystal display device in accordance with the present embodiment includes the steps of (1) depositing an insulating material on the transparent substrate 5, (2) forming the hard coat film 34 in stripes by subjecting the insulating material to photolithography and an etching process using the photoresist 41, (3) depositing metals on the hard coat film 34 while maintaining the photoresist 41, (4) forming the metal electrodes 35 in the hard coat film 34 by removing the metals deposited on the hard coat film 34 simultaneously with the photoresist 41, (5) depositing a transparent conducting material on a layer composed of the hard coat film 34 and the metal electrodes 35, and (6) forming the scanning electrodes 11 in stripes by subjecting the transparent conducting material to photolithography and an etching process using photoresist.

With this manufacturing method, the hard coat film 34 is formed in stripes, and thereafter metals are deposited on the hard coat film 34 by vacuum deposition or spattering without removing the photoresist 41 so as to form the metal electrodes 35 by the lift-off method. Thus, it is ensured that the metal electrodes 35 are implanted in the hard coat film 34 without inducing pattern shifting. Further, since the metals are deposited by vacuum deposition or spattering, it is possible to control the film thickness of the metal with ease such that the surface of the metal electrodes 35 and the surface of the hard coat film 34 coincide with a step-difference of within 30 nm. Therefore, it is possible to substantially completely eliminate the step-difference on the surface of the scanning electrodes 11 formed on the metal electrodes 35 and the hard coat film 34. As a result, it is possible to manufacture a liquid crystal display device capable of realizing uniform displaying with high contrast without adversely affecting the alignment and switching characteristics of the liquid crystal.

The insulating material deposited on the transparent substrate 5 is made of hard silicon resin which is prepared by curing heat curable silicon resin. In order to implant the metal electrodes 35 into the grooves of the hard coat film 34, it is required that the hard coat film 34 be made of a material which can be etched using photosensitive resin such as photoresist as a mask. The hard silicon resin can be etched by hydrofluoric acid, and therefore allows the metal electrodes 35 to be implanted by the lift-off method. Note that, in the case of adopting photosensitive resin as an insulating material, although patterns can be formed with ease, the lift-off method cannot be adopted.

Further, the hard coat film 34 is etched by wet etching using hydrofluoric acid. Thus, since the hard silicon resin can be etched by hydrofluoric acid, by carrying out photolithography and a wet etching process using hydrofluoric acid, the silicon resin can be patterned in stripes with ease.

Note that, in the present embodiment, the arrangement of the electrode substrate 32 is the same as that of the electrode substrate 2 of First Embodiment. However, it is possible to adopt an arrangement wherein the hard coat film is employed in the electrode substrate 31. Namely, it is possible to adopt an electrode substrate wherein a layer composed of the hard coat film and metal electrodes, signal electrodes, an insulating film, and an alignment film are deposited in this order on a transparent substrate. In manufacturing of such an electrode substrate, although the transparent substrate is also etched when etching the hard coat film, the metals are deposited while maintaining the photoresist on the etched grooves so as to implant the metal electrodes by the lift-off method.

Note that, in First and Second Embodiment, the metal electrodes are formed by the lift-off method. However, it is possible to form the metal electrodes not by the lift-off method, but using a photomask. In this method, after removing the photoresist on the insulating film, which has been patterned, metals are deposited by vacuum deposition or spattering. Then, the photoresist is deposited again, and the photomask placed so as to coincide with the pattern of the insulating film is exposed and developed, so that the photoresist remains only on the metals filling the groove pattern of the insulating film. Thereafter, the metals are etched using the photoresist as a mask, thus forming the metal electrodes. However, in this method, since positioning of the photomask is difficult, there is a case where a pattern shift is generated. Thus, the lift-off method is more preferable in forming the metal electrodes because then it is possible to manufacture the liquid crystal display device with no pattern shift and no step-difference on the substrate.

Note that, although, in First and Second Embodiment, the metal electrodes have a double-layered structure, it is also possible to adopt a single-layered structure. However, generally, since a low resistant metal such as Cu, Al, or alloys thereof shows a weak adhesion to glass, color filter, or light-transmissive resin, etc., when the metal electrodes are formed using only the low resistant metal, there is a chance that the films are detached at the interface between the metal electrodes and the glass, color filter, or the light-transmissive resin.

When the metal electrodes have a double-layered structure wherein as an under coat of the film made of the low resistant metal, a thin film of ITO or Ta having strong adhesion not only to the low resistant metal but also to glass, color filter, or light-transmissive resin is deposited, it is possible to prevent the film of the low resistant metal and the film contacting the low resistant metal film from being detached from each other, and the electrode resistance can be sufficiently reduced by the low resistant metal.

Note that, the low resistant metal adopted as the metal electrodes is not particularly limited, provided that the resistance of the metal is lower than that of ITO or Ta. As such a low resistant metal, other than Al and Cu, for example, Au, Ag, Ni, Mo, and alloys of one or more than one kind of these metals are available. Of those low resistant metals, Cu, Al, and alloys thereof are particularly preferable from the view point of adhesion to Ta or ITO, resistivity, and the manufacturing cost.

Namely, it is preferable that the metal electrodes of the liquid crystal display devices in accordance with First and Second Embodiment include a layer made of at least one metal selected from the group consisting of Cu, Al, and alloys thereof. With this arrangement, it is possible to efficiently and inexpensively lower the electrode resistance of the liquid crystal display device.

Also, it is preferable that the metal electrodes have a double-layered structure composed of (1) a first metal film provided so as to contact with the under layer and the layers on the both sides and (2) a second metal film provided on the first metal film, which contacts neither the under layer nor the layers on the both sides, wherein the first metal film is made of a metal selected from the group consisting of ITO and Ta. With this arrangement, it is possible to improve the adhesion of the metal electrodes and the under layer and the layers on the both sides thereof, thus preventing breakage of wire and conduction failure caused by detachment of films at the interface between the metal electrodes and the contacting layers.

Note that, though First and Second Embodiment adopt an arrangement with a color filter, it is also possible to adopt an arrangement without a color filter.

Also, although First and Second Embodiment adopt an arrangement wherein metal electrodes are provided on each of the two electrode substrates, it is possible to adopt an arrangement wherein the metal electrodes are provided on only one of the two electrode substrates.

As described, the liquid crystal display device of the present invention has an arrangement wherein the transparent electrodes are provided on at least one of the pair of electrode substrates via the insulating film made of hard silicon resin, and a plurality of metal electrodes electrically connected individually to the stripe transparent electrodes are formed in the insulating film.

With this arrangement, since the metal electrodes are connected to the transparent electrodes, it is possible to greatly lower the electrode resistance of the transparent electrodes, and to significantly improve the displaying quality. Also, since hard silicon resin whose property resembles that of glass is adopted, it is possible to adopt a manufacturing method wherein the metal electrodes are formed by the lift-off method. As a result, it is possible to obtain with ease a liquid crystal display device capable of uniform displaying with high contrast.

Also, since the insulating film has a double-layered structure composed of the first insulating film made of an insulating material which is not etched by dry etching using oxygen plasma or oxygen ion, and the second insulating film made of translucent resin, it is possible to adopt a manufacturing method wherein the metal electrodes are formed by the lift-off method.

Further, since the first insulating film is made of an insulating material which is not etched by oxygen plasma or oxygen ion, it is possible to accurately control the depth of etching groove, thus allowing the surface height of the metal electrodes to be accurately controlled.

In the liquid crystal display device of the present invention, it is preferable that the surface height of the metal electrodes and the surface height of the insulating film are equal.

With this arrangement, the first or second transparent electrodes are formed on a flat surface, and therefore it is possible to prevent disturbance in the alignment of the liquid crystal layer, which is generated by the step-difference, thus further improving the displaying quality of the liquid crystal display device.

Also, in the liquid crystal display device of the present invention, since ferroelectric liquid crystal is adopted, it is possible to provide a liquid crystal display device having desirable characteristics such as a memory effect, a high response, and a wide viewing angle, capable of highly detailed and large capacity displaying.

Further, in the manufacturing method of the liquid crystal display device of the present invention, since the metal electrodes are formed by the lift-off method, it is possible to implant the metal electrodes into the insulating film without inducing pattern shifting. Further, because the film thickness of the metals is controlled with ease, it is possible to substantially completely eliminate the step-difference on the transparent electrodes formed on the metal electrodes and the insulating film. As a result, it is possible to obtain with ease, without inducing an adverse effect on the alignment and the switching characteristic of the liquid crystal, a liquid crystal display device capable of uniform displaying with high contrast.

In the manufacturing method of the liquid crystal display device of the present invention, it is preferable that the insulating material is translucent resin. Also, in this case, it is further preferable that the etching of the insulating material be carried out by dry etching using oxygen plasma or oxygen ion.

This allows, by photolithography and by the dry etching process using oxygen plasma or oxygen ion, the translucent resin to be patterned in stripes with ease.

Alternatively, in the manufacturing method of the liquid crystal display device of the present invention, it is possible to adopt, as the insulating material, hard silicon resin prepared by curing heat curable silicon resin. In this case, it is preferable that the etching of the insulating material be carried out by wet etching using hydrofluoric acid.

This allows, since the hard silicon resin can be etched with hydrofluoric acid, the silicon resin to be patterned in stripes with ease by photolithography and the wet etching process using hydrofluoric acid.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device including a pair of electrode substrates, each having a substrate and a plurality of transparent electrodes provided in stripes on the substrate, and a liquid crystal layer enclosed in a spacing between the pair of electrode substrates, comprising:

an under overcoat film, a first insulating film, and a second insulating film, respectively provided between the substrate and the plurality of transparent electrodes of at least one of the pair of electrode substrates, said first insulating film being provided on said under overcoat film, and said second insulating film being provided on said first insulating film, said under overcoat film being etched by dry etching using oxygen plasma or oxygen ion, said first insulating film being made of an insulating material being not etchable by dry etching using oxygen plasma or oxygen ion, and said second insulating film being made of light-transmissive resin being etchable by dry etching using oxygen plasma or oxygen ion; and a plurality of metal electrodes provided in said second insulating film, electrically connected individually to the plurality of transparent electrodes.

* * * * *